Aug. 27, 1935.  F. L. O. WADSWORTH  2,012,647
BRAKE
Filed July 27, 1932     3 Sheets-Sheet 1

INVENTOR.
FRANK L. O. WADSWORTH
BY
ATTORNEY

Aug. 27, 1935.  F. L. O. WADSWORTH  2,012,647
BRAKE
Filed July 27, 1932   3 Sheets-Sheet 2
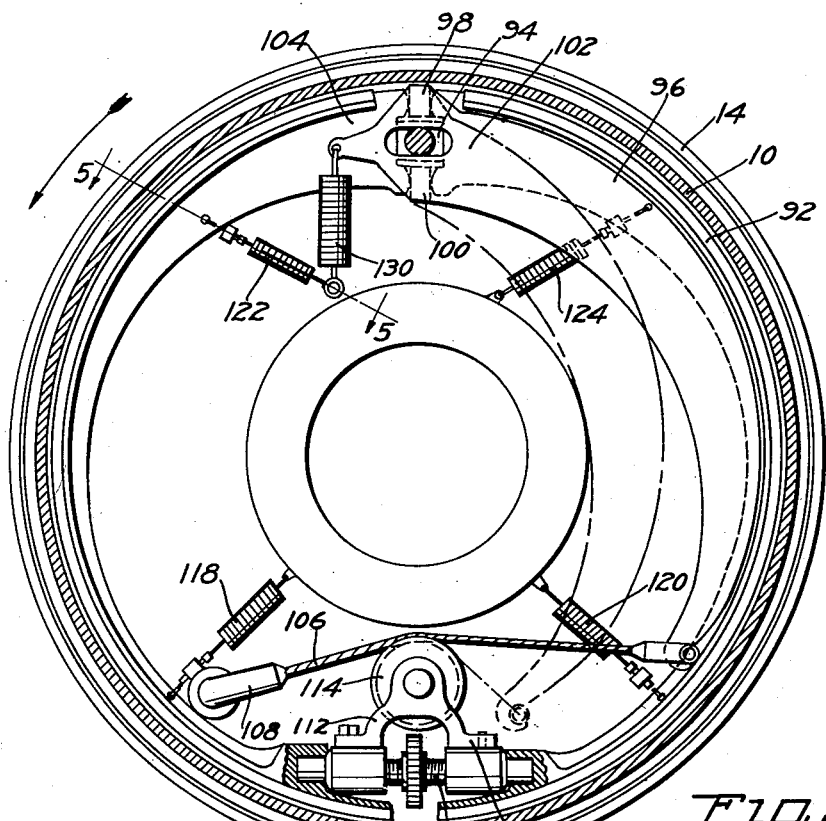
Fig. 3
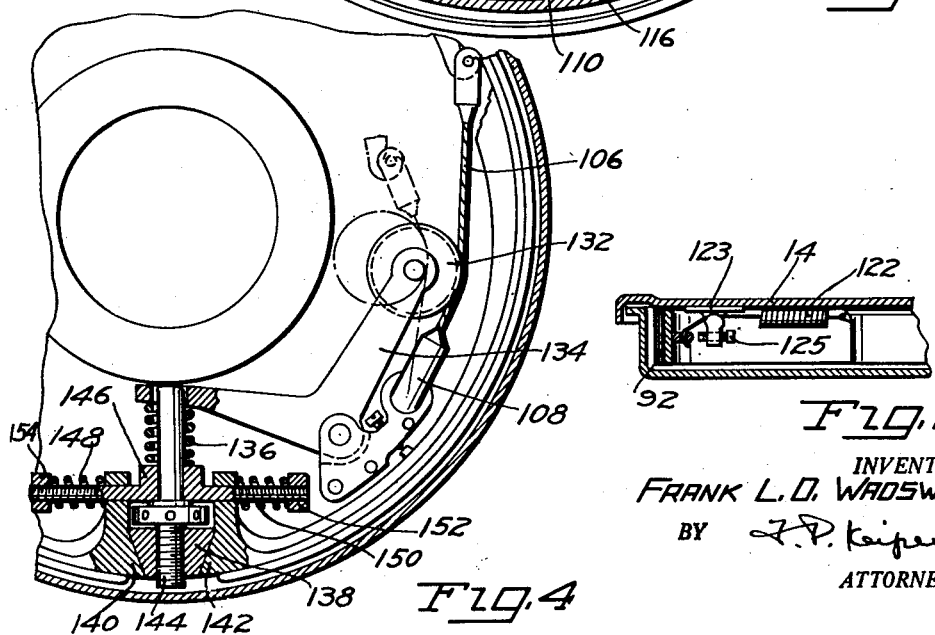
Fig. 4
Fig. 5
INVENTOR.
FRANK L. O. WADSWORTH
BY  *J. P. Keiper*
ATTORNEY Aug. 27, 1935.  F. L. O. WADSWORTH  2,012,647
BRAKE
Filed July 27, 1932  3 Sheets-Sheet 3

INVENTOR.
FRANK L. O. WADSWORTH
BY F. P. Keifer
ATTORNEY

Patented Aug. 27, 1935

2,012,647

UNITED STATES PATENT OFFICE 2,012,647

BRAKE

Frank L. O. Wadsworth, Pittsburgh, Pa., assignor to Bendix Aviation Corporation, South Bend, Ind., a corporation of Delaware Application July 27, 1932, Serial No. 625,114

21 Claims. (Cl. 188—78)

This invention relates to brakes and more particularly to vehicle brakes of the internal expanding type having in effect a single anchor and floating friction shoe.

The above referred to type of brake comprises in general a floating friction shoe having separable ends adapted to be spread apart by an expanding mechanism and an anchor either located between the shoes in order to engage one shoe end or the other, depending on the direction of drum rotation, or else a separate anchor located near each separable end of the shoe but for a similar purpose, as the single anchor. In most of these structures, some difficulty is encountered with clicks resulting from the fact that one or both ends of the brake shoe leave its or their points of anchorage before the shoe actually engages the brake drum, and the shoe upon engaging the brake drum suddenly thrusts one of its ends back into solid anchor engagement. Obviously should the movement resulting in click be excessive, the servo action of the brake may seriously amplify the shock and damage the brake or its associated vehicle. To prevent this, minimum clearances in brakes are maintained as well as means provided to resiliently retain one shoe end in anchor engagement, usually the end which takes the forward braking torque, thus disregarding the presence of click in reverse operation.

Accordingly, it is an object of this invention to provide a brake having novel features adapted to do away with the difficulties herein above referred to.

A further object of the invention is the provision of a brake having a floating friction band wherein both ends retain their anchor engagement until after friction contact with the drum has been made.

A still further object is the provision of means for engaging a portion of the friction band with the drum prior to the spreading of the ends of the friction band.

Still another object is the provision of common means for successively engaging a central portion and the end portions of a floating friction shoe.

A still further object is the provision of means for contacting a central portion of a floating brake band by reaction of a guide bearing of a flexible cable control.

A further object is the provision of actuating means in combination with a brake having floating friction means, wherein reaction is utilized to first engage a central portion of the friction lining.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Figure 3 is a front elevation partly in section of a single anchor brake wherein a cam, lever, cable, and cable guide are used for initially engaging a central portion;

Figure 4 is a slightly modified form of Figure 3;

Figure 5 is a section through the line 5—5 of Figure 3;

Figure 1:
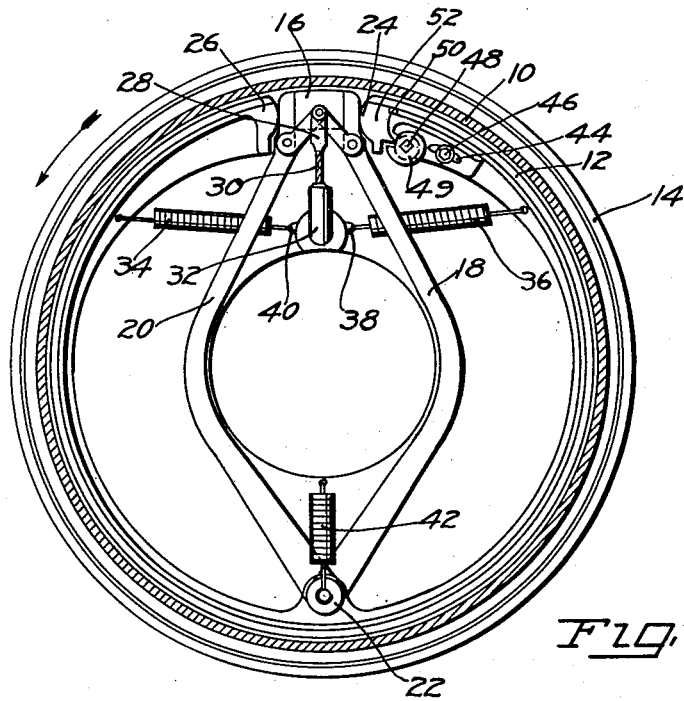
Figure 1 is a front elevation partly in section of a single anchor brake having actuating means in accordance with the invention which reacts to initially engage a central portion of the lining.

Referring to the drawings more in detail there is shown in Figure 1 a brake drum 10, a brake shoe 12, and a backing plate 14 carrying a single anchor 16. Actuating levers 18 and 20 are pivoted to the brake shoe 12 at a point 22 diametrically opposite the anchor and extend diametrically across the brake and between the anchor 16 and the shoe ends 24 and 26. A toggle 28 and cable 30 extending through the backing plate by means of a conduit 32 are provided to spread levers or struts 18 and 20 to actuate the brake. A pair of springs 34 and 36 are connected between the shoe ends 26 and 24 and suitable hooks 38 and 40 mounted upon the backing plate in order to maintain or urge the ends of the shoes against the anchor 16. A third spring 42 is connected between the pivot 22 and the backing plate and is adjusted to maintain proper shoe clearance in released brake position. The end 24 of the brake shoe 12 is provided with an adjustable member 52 having a pair of slots one of which is indicated at 44 adapted to slide upon the bolts 46 and 48. In order to adjust the length of the brake shoe an eccentric 49 is pivoted upon the bolt 48 and is adapted to engage a shoulder 50 upon the adjustable member 52 so that rotation thereof may produce lengthwise adjustment of the brake shoe.

Figure 2:
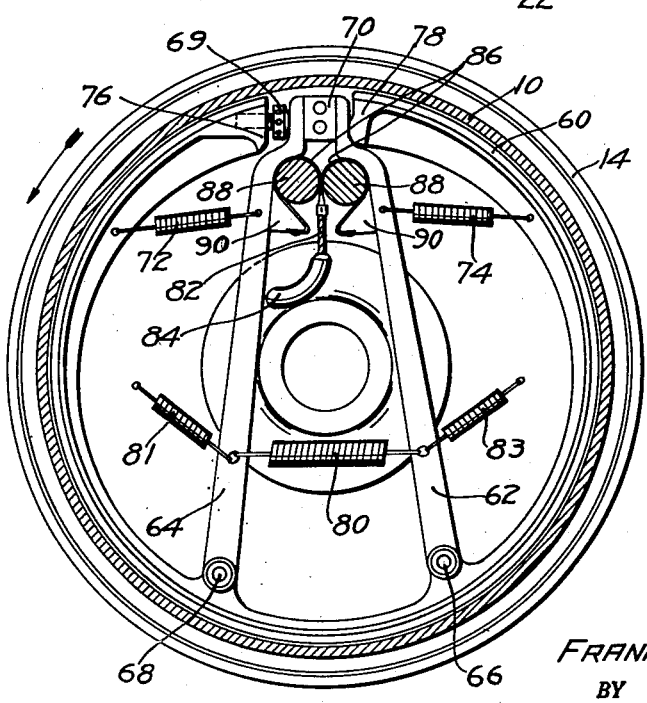
Figure 2 is a front elevation partly in section showing a slightly modified form having a different actuating mechanism from that shown in Figure 1.

A slightly different construction embodying the same characteristics as that shown in Figure 1 is shown in Figure 2 wherein the usual brake drum 10, the friction shoe 60 and backing plate 14 having an anchor 70, is shown. In order to actuate the structure therein illustrated a pair of levers or struts 62 and 64 are shown pivoted at 66 and 68 to the brake shoe 60 and extending between the shoe ends and the anchor diametrically opposite. An adjusting screw 69 is provided bearing against the lever 64 to provide for necessary adjustment for wear. Suitable springs 72 and 74 are provided to maintain the ends 76 and 78 of the friction shoe 60 in constant engagement with the levers 64 and 62 and a spring 80 is provided to urge the levers 62 and 64 into contact with the anchor 70 together with springs 81 and 83 provided to maintain the brake normally in released position.

In order to spread the levers, a novel actuating mechanism is used comprising a flexible cable 82 passing through a conduit 84 in the backing plate and secured to a pair of flexible band tension members 86 passing around rollers 88 and secured upon wedge blocks 90 rigidly secured to levers 64 and 62, as shown. It will be readily observed that a pull upon the tension element 82 will cause the rollers 88 encompassed by the bands 86 to roll upon the wedge faces of the wedges 90 and thus tend to spread the struts or levers 62 and 64. However, in both showings of Figures 1 and 2 the downward thrust of the spreading force exerted by the toggle of Figure 1 and the rollers of Figure 2 will tend to thrust the struts downward prior to any spreading action as a result of the balance of various springs utilized in the two modifications. This downward thrust will engage the central portion of the shoe before either end leaves its engagement with the anchor thus preventing any possibility of click since the initial engagement of the central portion of the friction shoe will determine which shoe end is to leave the anchor when spreading action between the ends begins.

In Figure 3 there is shown a brake having a lever and cam for actuating the same combined with suitable mechanism for deriving the sequence of operation outlined with respect to Figures 1 and 2. Illustrated in Figure 3 are the usual brake drum 10 and friction shoe 92, backing plate 14, and an anchor 94 secured thereto. In order to actuate the brake a floating cam and lever 96 having cam surfaces 98 and 100 are employed to spread the ends 102 and 104 of the brake shoe. A flexible cable 106 extending through a conduit 108 in the backing plate is secured to the end of the lever 96. In order to adjust the brake for wear a suitable left and right adjusting screw 110 is provided which may be threaded into the ends of the brake shoe diametrically opposite the anchor. Secured to one of the shoe ends is a bracket 112 carrying a guide pulley 114 over which the cable 106 passes in engagement therewith. The bracket may be secured to the other shoe end as at 116 if the bracket contains sufficient resiliency to permit adjustment or else may be permitted to slide freely thereon. Suitable springs 118, 120, 122, 124 and 130 may be provided for the purpose of retaining the parts in normal released position. The radial springs 118, 120, 122, and 124 may be positioned as shown in Figure 5 wherein the backing plate 14 is shown as carrying a guide member 123 through which the end of the spring 122 passes prior to being secured to the shoe 92. A suitable clearance adjusting screw 125 may be threaded in the guide 123 and adapted to engage the flange of the shoe 92.

It will be readily observed that in applying tension to the cable 106, guide pulley 114 will be first thrust downwardly causing the adjacent portion of the friction shoe to engage the drum, so that upon subsequent tension being applied and separation of the shoes about the anchor, one of the shoes will be held in engagement with the anchor by braking torque thus avoiding the possibility of any click.

In Figure 4 a slight modification of the structure of Figure 3 is shown wherein a guide pulley 132 is provided on a bell crank 134 which acts through a resilient spring 136 to engage the brake shoe adjacent thereto. An adjusting mechanism comprising a wedge 138 is adapted to act upon the inclined ends 140 and 142 of the brake shoes to spread the same and make adjustments for wear. Movement of the wedge 138 is accomplished by means of a screw 144 which is carried in the bearing member 146 resiliently centered between the shoes by means of springs 148 and 150 and adjusting nuts 152 and 154. As may be readily seen upon a tension being applied to the cable 106 a rocking action of the bell crank 134 carrying roller 132 will take place thrusting the friction means in engagement with the brake drum as in Figure 3.

Figure 6:
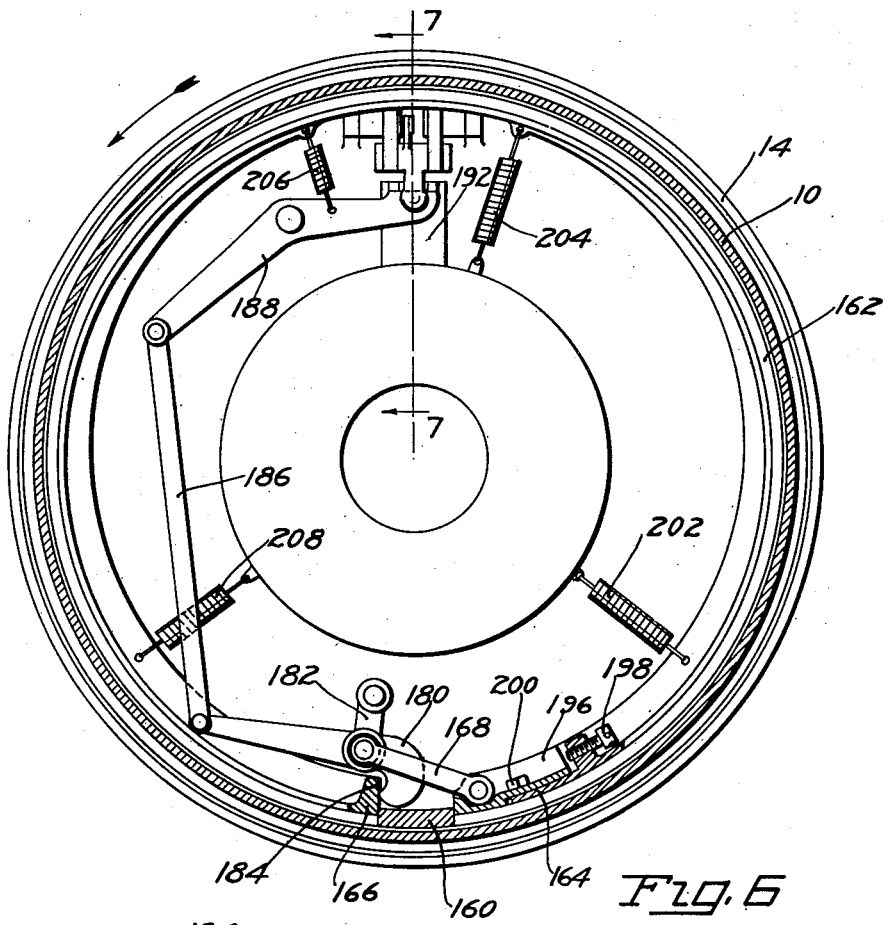
Figure 6 is a front elevation partly in section of another modification wherein a toggle actuating means is utilized to obtain the desired results.
Figure 7:
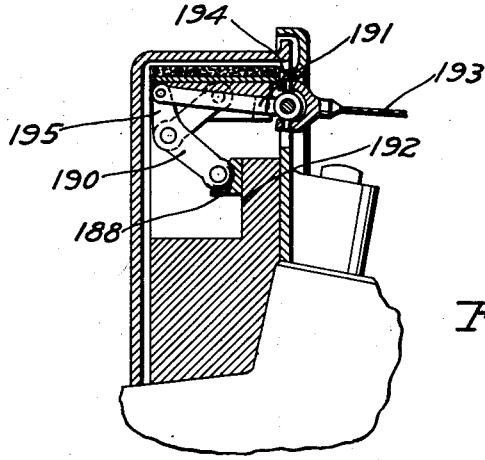
Figure 7 is a section through the line 7—7 of Figure 6 showing the arrangement of the toggle.

A further modification for accomplishing the same purpose is shown in Figure 6 wherein a toggle is arranged between the usual actuating mechanism and a central portion of the friction shoe. As shown, the construction comprises a brake drum 10 and a backing plate 14 carrying an anchor 160 and provided with a floating friction shoe as indicated at 162. A suitable linkage for spreading the ends 164 and 166 of the friction shoe comprises a link 168 and a hook shaped lever 180 pivoted by a short link 182 to the backing plate. The hook end of the lever 180 during actuation of the brake is free to slide upon the radial surface 184 of the brake shoe end 166. The link and lever 186 and 188 respectively are connected to the lever 180 and adapted to be actuated by the toggle 190 as is best shown in Figure 7. A bearing member 192 is provided in order to carry the thrust of the toggle on the lever 188. The opposite end of the toggle is adapted to radially thrust the friction shoe into engagement with the brake drum and for this purpose the actuating link 191 and cable 193 are attached to an extension 195 upon the knee of the toggle. Any suitable means as 194 struck up in the backing plate may be used to compensate for the side thrust of the shoe and toggle and guide the same. A suitable adjustable end member 196 is provided on the end 164 of the brake shoe and is adapted to be moved circumferentially with respect to the shoe by the adjustment screw 198 and to be locked in position by the clamping stud 200. Suitable springs 202, 204, 206, and 208 may be provided to maintain the brake in proper released balance.

In operation, referring to Figures 1 and 2, it will readily be seen that a pull on the operating cable tends to spread the struts against the action of the springs 34 and 36 of Figure 2. These springs are tensioned such that before permitting spreading action the struts will be thrust downward so as to engage a central portion of the friction lining with the drum. In other words, the springs 32, 36, and 80 are so tensioned as to insure and require the reaction of the friction lining in contact with the drum before spreading action of the brake shoes may begin. As a result, the central portion of the brake shoe engages the drum first while both shoe ends are in contact with the anchor. One of the shoe ends immediately commences to resist braking torque, and is maintained in anchor engagement thereby throughout the subsequent increase in braking pressure, and spreading of the shoes.

Similarly in the modifications of Figures 3 and 4 the sequence of operation remains the same. Tension applied to the cable 106 first tends to thrust the guide toward the brake drum since the return spring 130 is of proper tension to bring this about. In Figure 6, operation of the toggle tends to expand the shoe in the same manner necessarily thrusting the central portion of the brake shoe into drum engagement before extending the springs 202 and 208, the latter of which are of sufficient tension to force the central portion of the friction means into drum contact before spreading action about the anchor 160 may take place.

While various embodiments and modifications of the invention have been illustrated and described it is to be understood that the invention is not limited thereto but may be embodied in various mechanical forms. As such changes in construction and arrangement of parts may be made without departing from the spirit of the invention as will be well understood by those skilled in the art, reference will be had to the appended claims for a definition of the limits of the invention.

I claim:

1. A brake comprising a drum, friction means therein having a pair of separable ends, an anchor arranged between said ends, and actuating means adapted to urge said separable ends apart and mechanically connected to a central portion of said friction means to thrust it into drum engagement.

2. A brake comprising a drum, friction means therein having a pair of separable ends, an anchor therebetween, a spreading means for separating said ends, a cable guide carried by a part of the friction means remote from its ends, and a tension operating cable connected to said spreading means and passing over said guide.

3. A brake comprising a drum, friction means therein having a pair of separable ends, an anchor therebetween, actuating mechanism including a tension cable for spreading said ends, said cable bearing upon an intermediate portion of said friction means to derive additional pressure.

4. A brake comprising a drum, friction means therein having a pair of separable ends, an anchor therebetween, actuating mechanism including a tension cable for spreading said ends, said cable bearing upon an intermediate portion of said friction means for initial frictional contact of said portion with said drum.

5. A brake comprising a drum, anchor means and a friction means having separable ends normally anchored, means linked to a central portion of the friction means for actuating said portion of said friction means into engagement with the drum while retaining said ends normally anchored, and means associated with said actuating means and acting on said ends for subsequently spreading said ends.

6. A brake comprising a drum, a friction means therein having separable ends, an anchor therebetween normally in contact therewith, means for spreading said ends, and toggle operating means connected to a central portion of said friction means and said spreading means.

7. A brake comprising a drum, friction means therein having separable ends, anchor means therefor, substantially diametrical levers, an end of each pivoted to a central portion of said friction means and adapted to spread said separable ends, and means for exerting a radial thrust toward said pivoted ends and for spreading said levers.

8. A brake comprising a drum, friction means therefor, an anchor intermediate a pair of separable ends of said friction means, actuating means acting directly on a central portion of said friction means, and said separable ends, and mechanism to radially thrust said actuating means in the direction of said central portion and actuate the same to spread said ends.

9. A brake comprising a drum, friction means having separable ends, anchor means for said ends, and means connected to said ends and to a central portion of the friction means and operable to thrust said central portion of said friction means into drum contact and spread said separable ends.

10. A brake, a drum, an anchor, a band friction shoe, links pivoted to a central portion of said shoe and extending between the ends of said shoe and the anchor, means for separating said links exerting a radial reaction to first frictionally engage said central portion.

11. A brake comprising a drum, friction means and an anchor, actuating means to engage said brake comprising a flexible tension member, a guide for said member including a roller mounted on the friction means and engaged by the tension member and reacting to create braking pressure.

12. A brake comprising a drum, floating friction means having separable ends, anchor means, resilient means urging said ends into anchor engagement during released position, and actuating means including a linkage connected to the ends and to a central portion of the friction means for expanding said friction means and initially contacting a central portion thereof with the drum before disturbing said release position anchor engagement.

13. A brake comprising friction means, links connected to a central portion of said means and engaging the ends of said means, and an actuating device operable to thrust said links lengthwise toward their connection with the friction means and also operable to force the links apart.

14. A brake comprising friction means, links connected to a central portion of said means and engaging the ends of said means, and an actuating toggle opening downwardly and operable to thrust said links lengthwise toward their connection with the friction means and also operable to force the links apart.

15. A brake comprising friction means, links connected to a central portion of said means and engaging the ends of said means, and actuating means including a wedging device for urging said links lengthwise and also wedging them apart.

16. A brake comprising friction means, links connected to a central portion of said means and engaging the ends of said means, and actuating means including wedges on said links and operating members engaging the wedges for urging said links lengthwise and also wedging them apart.

17. A brake comprising friction means having a centrally-located adjustment and a roller mounted thereon, and an applying device having an operating cable passing over said roller and urging it in a direction to force the friction means radially outward.

18. A brake comprising friction means having a centrally-located roller, and an applying device having an operating cable passing over said roller and urging it in a direction to force the friction means radially outward.

19. A brake comprising friction means having a central adjustment, a lever bearing against said adjustment, and applying means acting on the ends of the friction means and also acting on said lever to rock it in a direction to force the central portion of the friction means radially outward.

20. A brake comprising friction means, a pair of members bearing against a central portion of said friction means, and applying means acting on the ends of the friction means and also acting on and connected to said members to move them in a direction to force the central portion of the friction means radially outward.

21. Applying means for a brake comprising two pivotally-connected members forming a toggle extending radially of the brake, a tension element extending perpendicular to the plane of the brake and connected to said toggle to straighten it to apply the brake, and auxiliary brake-applying means connected to one member of the toggle and actuated by the reaction thereof.

FRANK L. O. WADSWORTH.